US008954252B1

(12) United States Patent
Urmson et al.

(10) Patent No.: US 8,954,252 B1
(45) Date of Patent: Feb. 10, 2015

(54) PEDESTRIAN NOTIFICATIONS

(71) Applicant: Google Inc., Mountain View, CA (US)

(72) Inventors: Christopher Paul Urmson, Mountain View, CA (US); Ian James Mahon, Berkeley, CA (US); Dmitri A. Dolgov, Mountain View, CA (US); Jiajun Zhu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/095,107

(22) Filed: Dec. 3, 2013

Related U.S. Application Data

(63) Continuation of application No. 13/628,290, filed on Sep. 27, 2012.

(51) Int. Cl.
*G08G 1/16* (2006.01)

(52) U.S. Cl.
CPC ..................................... *G08G 1/166* (2013.01)
USPC ................. 701/70; 701/25; 701/36; 701/301; 340/435; 340/436; 340/901; 340/903; 340/933; 180/167

(58) Field of Classification Search
USPC ............. 701/24, 36, 45, 70, 96, 301, 302, 25; 340/435, 436, 901, 903, 937, 943; 348/148; 382/103, 104, 107; 180/168, 180/169
See application file for complete search history.

(56) References Cited

U.S. PATENT DOCUMENTS

| | | | |
|---|---|---|---|
| 2,190,123 A * | 2/1940 | Pace | 362/503 |
| 5,485,892 A * | 1/1996 | Fujita | 180/167 |
| 5,642,094 A * | 6/1997 | Marcella | 340/479 |
| 6,072,391 A * | 6/2000 | Suzuki et al. | 340/468 |
| 7,095,318 B1 * | 8/2006 | Bekhor | 340/485 |
| 7,194,347 B2 * | 3/2007 | Harumoto et al. | 701/45 |
| 7,209,822 B2 * | 4/2007 | Linden | 701/96 |
| 7,671,725 B2 * | 3/2010 | Tsuji et al. | 340/435 |
| 7,696,863 B2 * | 4/2010 | Lucas et al. | 340/435 |

(Continued)

FOREIGN PATENT DOCUMENTS

JP    2008-120162 A    5/2008

OTHER PUBLICATIONS

Massimo Bertozzi, Alberto Broggi, Massimo Cellario, Alessandra Fascioli, Paolo Lombardi, and Marco Porta, Artificial Vision in Road Vehicles, Proceedings of the IEEE, vol. 90, No. 7, Jul. 2002, pp. 1258-1271.

(Continued)

*Primary Examiner* — Thomas G Black
*Assistant Examiner* — Sara Nelson
(74) *Attorney, Agent, or Firm* — Lerner, David, Littenberg, Krumholz & Mentlik, LLP

(57) ABSTRACT

Aspects of the disclosure relate generally to notifying a pedestrian of the intent of a self-driving vehicle. For example, the vehicle may include sensors which detect an object such as a pedestrian attempting or about to cross the roadway in front of the vehicle. The vehicle's computer may then determine the correct way to respond to the pedestrian. For example, the computer may determine that the vehicle should stop or slow down, yield, or stop if it is safe to do so. The vehicle may then provide a notification to the pedestrian of what the vehicle is going to or is currently doing. For example, the vehicle may include a physical signaling device, an electronic sign or lights, a speaker for providing audible notifications, etc.

18 Claims, 12 Drawing Sheets

(56) References Cited

U.S. PATENT DOCUMENTS

| | | | |
|---|---|---|---|
| 7,733,266 B2* | 6/2010 | Kikuchi | 342/70 |
| 7,769,506 B2* | 8/2010 | Ohtsuji | 701/25 |
| 7,824,085 B2* | 11/2010 | Watanabe | 362/466 |
| 8,085,139 B2* | 12/2011 | Kanevsky et al. | 340/436 |
| 8,195,394 B1* | 6/2012 | Zhu et al. | 701/514 |
| 8,514,100 B2* | 8/2013 | Yamashita | 340/901 |
| 2004/0193347 A1* | 9/2004 | Harumoto et al. | 701/45 |
| 2006/0125919 A1* | 6/2006 | Camilleri et al. | 348/148 |
| 2008/0162027 A1* | 7/2008 | Murphy et al. | 701/117 |
| 2009/0326774 A1* | 12/2009 | Wang | 701/70 |
| 2010/0063676 A1* | 3/2010 | Ito | 701/36 |
| 2011/0128161 A1* | 6/2011 | Bae et al. | 340/901 |
| 2011/0184617 A1* | 7/2011 | Hegemann et al. | 701/70 |
| 2011/0295464 A1* | 12/2011 | Zagorski et al. | 701/41 |
| 2014/0035740 A1* | 2/2014 | Lettstrom et al. | 340/479 |

OTHER PUBLICATIONS

Pennycooke, N. Aevita: Designing Biometric Vehicle-to-Pedestrian Communication Protocols for Autonomously Operating & Parking On-Road Electric Vehicles. Submitted to the Program in Media Arts and Sciences, School of Architecture and Planning. Massachusetts Institute of Technology. 2012, 184 pages.

Teller, S., et al. A Voice-Commandable Robotic Forklift Working Alongside Humans in Minimally-Prepared Outdoor Environments. Massachusetts Institute of Technology. 2010, 8 pages.

* cited by examiner

FIGURE 1      100

PEDESTRIAN NOTIFICATIONS

CROSS REFERENCE TO RELATED APPLICATION

This application is a continuation of U.S. patent application Ser. No. 13/628,290, filed on Sep. 27, 2012, the entire disclosure of which is incorporated herein by reference.

BACKGROUND

Autonomous vehicles use various computing systems to aid in the transport of passengers from one location to another. Some autonomous vehicles may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are typically equipped with various types of sensors in order to detect objects in the environment. For example, autonomous vehicles may include lasers, sonar, radar, cameras, and other devices which scan and record data from the vehicle's environment. Sensor data from one or more of these devices may be used to detect objects and their respective characteristics (position, shape, heading, speed, etc.).

A typical driver may communicate with pedestrians to express their intent in a number of different ways including make eye-contact, use hand gestures and other forms of communication. In this regard, a driver may let a pedestrian know that it is safe to cross the road. However, other than signaling devices typical to non-autonomous vehicles, such as turn signals, head lights, high beams, brake lights, reverse lights, and some audible signals (horns, reverse light beepers, etc.), autonomous vehicles lack the capability to directly communicate the vehicle's future behavior. In addition, while it may be sufficient for a driver to slow down or stop a vehicle at a cross walk in addition to making eye contact with, waving to, speaking to, or flashing lights to a pedestrian to communicate to the pedestrian that the driver will wait for the pedestrian to cross, simply stopping a vehicle without these driver-initiated signals may not be sufficiently reassuring to the pedestrian that it is indeed safe to cross.

BRIEF SUMMARY

One aspect of the disclosure provides a method. The method includes maneuvering, by a processor without continuous input from a driver, a vehicle along a route including a roadway; receiving sensor data about the vehicle's environment collected by sensors associated with the vehicle; identifying an object in the vehicle's environment from the sensor data; selecting a plan of action for responding to the object, wherein the plan of action includes one of stopping the vehicle and yielding to the object, slowing the vehicle down and yielding to the object, or continuing along the route without change; and providing, by the processor without specific initiating input from the driver, a notification to the object indicative of the selected plan of action.

In one example, the method also includes determining whether the object is a pedestrian; determining whether the pedestrian is likely to cross a roadway of the route; determining that a projected path of the pedestrian will cross with a projected path of the vehicle, wherein the projected path of the vehicle is based on the route; and wherein the plan of action is further selected based on the determination that the projected path of the pedestrian will cross with a projected path of the vehicle. In this example, the plan of action is selected only if the object is a pedestrian.

In another example, the method also includes determining whether the object is likely to cross the roadway based on the object's proximity to the roadway and selecting the plan of action based on the determination of whether the object is likely to cross the roadway. In another example, the method also includes determining whether the object is likely to cross the roadway based on the object's current heading and speed as determined from the sensor data; and selecting the plan of action based on the determination of whether the object is likely to cross the roadway. In another example, the method also includes determining whether the object is likely to cross the roadway based on the object's location relative to a crosswalk and selecting the plan of action based on the determination whether the object is likely to cross the roadway.

In another example, selecting the plan of action includes determining whether if the vehicle slows down or continues on its current path, the object would have at least a minimum amount of time, given a distance the pedestrian has to travel along the predicted path across the roadway, to cross the roadway without the vehicle coming within a threshold distance of the object. In another example, selecting the plan of action includes determining whether the vehicle is able to come to a complete stop within a threshold distance of the projected path of the object. In this example, determining whether the vehicle is able to come to a complete stop within a threshold distance is based on the capabilities of a braking system of the vehicle, predetermined braking limits, and the distance between the vehicle and the projected path of the object along the projected path of the vehicle.

In another example, if the processor is unable to stop the vehicle and yield to the object or slow the vehicle down and yield to the object, the selected plan of action includes continuing along the route without change. In another example, the notification is provided by displaying an image indicative of the selected plan of action on an electronic sign mounted on the vehicle. In another example, the notification is provided by displaying text indicative of the selected plan of action on an electronic sign mounted on the vehicle. In another example, the notification includes playing an audible instruction message indicative of the selected plan through a speaker of the vehicle.

Another aspect of the disclosure provides a vehicle. The vehicle includes a processor configured. The processor is configured to maneuver, without continuous input from a driver, the vehicle along a route including a roadway; receive sensor data about the vehicle's environment collected by sensors associated with the vehicle; identify an object in the vehicle's environment from the sensor data; select a plan of action for responding to the object, wherein the plan of action includes one of stopping the vehicle and yielding to the object, slowing the vehicle down and yielding to the object, or continuing along the route without change; and provide, without specific initiating input from the driver, a notification to the object indicative of the selected plan of action.

In one example, the processor is also configured to determine whether the object is a pedestrian; determine whether the pedestrian is likely to cross a roadway of the route; determine that a projected path of an object will cross with a projected path of the vehicle, wherein the projected path of the vehicle is based on the route; and the plan of action is selected further based on the determination that the projected path of the pedestrian will cross with a projected path of the vehicle. In this example, the processor is also programmed to select the plan of action only if the object is a pedestrian. In another example, the processor is also programmed to determine whether the object is likely to cross the roadway based on the object's proximity to the roadway and select the plan of action based on the determination of whether the object is likely to cross the roadway. In another example, the processor is also programmed to determine whether the object is likely to cross the roadway based on the object's current heading and speed as determined from the sensor data and select the plan of action based on the determination of whether the object is likely to cross the roadway. In another example, the vehicle is also programmed to determine whether the object is likely to cross the roadway based on the object's location relative to a crosswalk and select the plan of action based on the determination whether the object is likely to cross the roadway.

Another aspect of the disclosure provides a non-transitory, tangible computer-readable storage medium on which computer readable instructions of a program are stored. The instructions, when executed by a processor, cause the processor to perform a method. The method includes maneuvering, without continuous input from a driver, a vehicle along a route including a roadway; receiving sensor data about the vehicle's environment collected by sensors associated with the vehicle; identifying an object in the vehicle's environment from the sensor data; selecting a plan of action for responding to the object, wherein the plan of action includes one of stopping the vehicle and yielding to the object, slowing the vehicle down and yielding to the object, or continuing along the route without change; and providing, without specific initiating input from the driver, a notification to the object indicative of the selected plan of action.

DETAILED DESCRIPTION

In one aspect of the disclosure, a computer 110 may maneuver a vehicle along a route, such as an autonomous driving mode without continuous input from a driver. The computer may receive data about the vehicle's environment collected by the vehicle's sensors. Using the data, the computer may identify an object in the vehicle's environment. The computer may then determine whether this object is likely to cross the roadway along which the vehicle's route travels. If not, the computer may identify other objects in the vehicle's environment from received sensor data and determine whether those other objects are likely to cross the roadway. In some examples, the computer may first determine whether the object is a pedestrian before determining whether the object is likely to cross the roadway.

If the computer identifies an object that is likely to cross the roadway, the computer may estimate a projected path of the object. The computer may then determine whether the projected path of the object will cross a projected path of the vehicle, for example, based on the route. If not, the computer may identify other objects in the vehicle's environment from received sensor data and determine whether those other objects are likely to cross the roadway.

If the computer determines that a projected path of an object will cross with the projected path of the vehicle, the computer may select a plan of action. The plan of action may include one of stopping the vehicle and yielding to the object, slowing the vehicle down and yielding to the object, or continuing along the route without change. Once a plan of action is selected, the computer may act on the plan of action and provide a notification to the object indicative of the selected plan of action.

Figure 1:
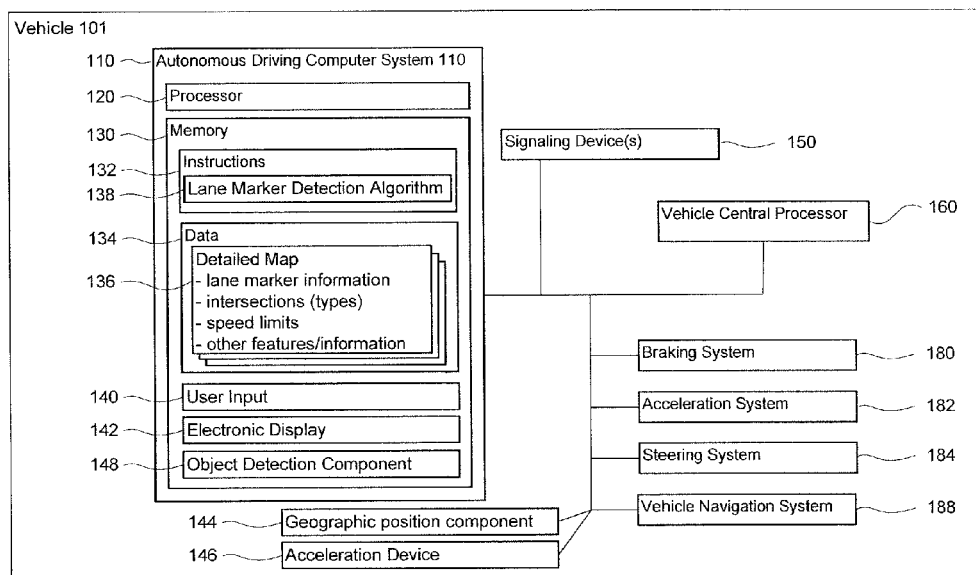
FIG. 1 is a functional diagram of a system in accordance with aspects of the disclosure.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC. Although FIG. 1 functionally illustrates the processor, memory, and other elements of computer 110 as being within the same block, the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components, such as steering components and deceleration components, may each have their own processor that only performs calculations related to the component's specific function.

In various aspects described herein, the processor may be located remotely from the vehicle and communicate with the vehicle wirelessly. In other aspects, some of the processes described herein are executed on a processor disposed within the vehicle while others are executed by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

Figure 2:
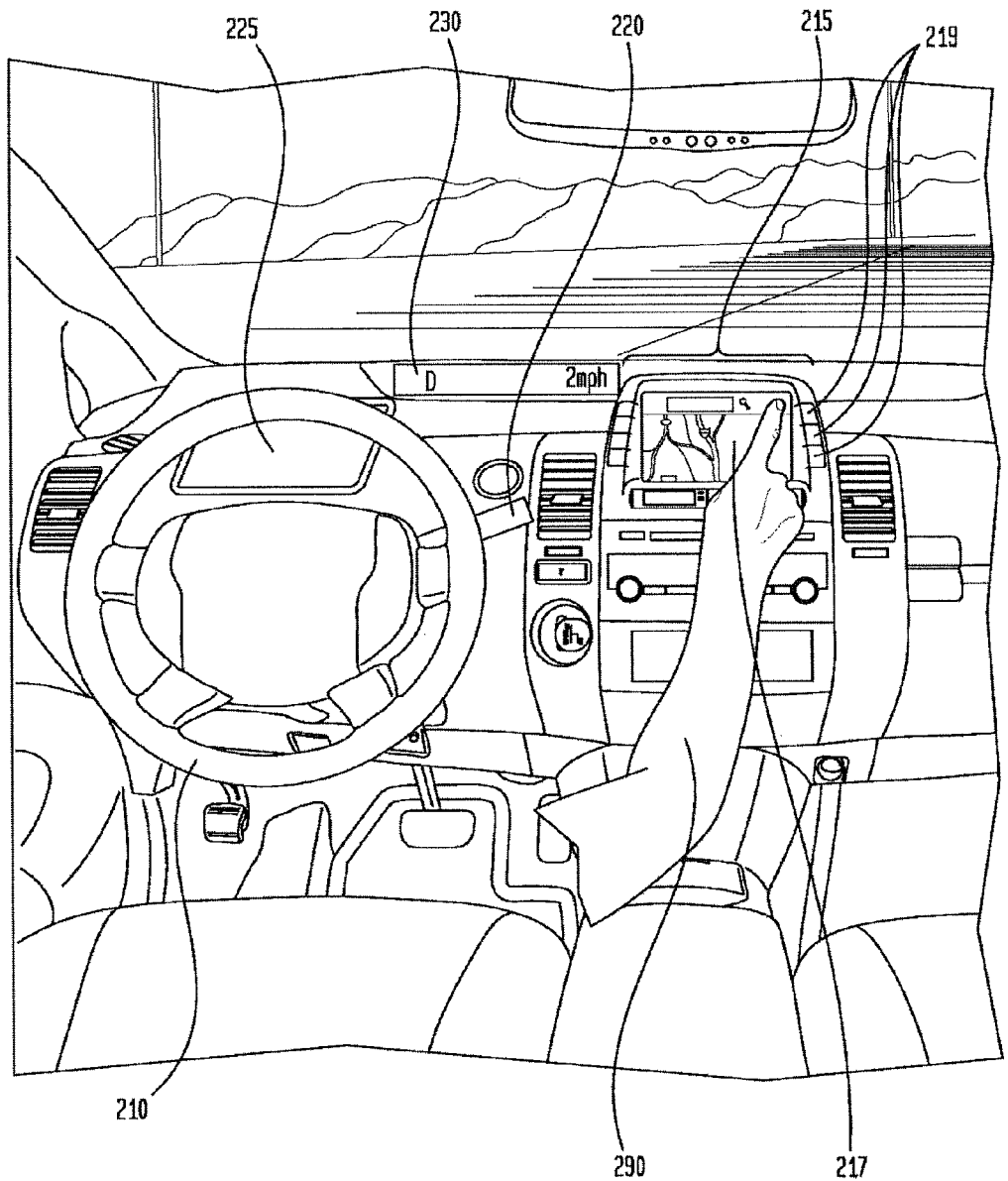
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more additional displays. For example, the vehicle may include a display 225 for displaying information regarding the status of the autonomous vehicle or its computer. In another example, the vehicle may include a status indicating apparatus such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle. For example, returning to FIG. 1, computer 110 may be in communication with the vehicle's conventional central processor 160 and may send and receive information from the various systems of vehicle 101, for example the braking 180, acceleration 182, steering 184, and navigation 186 systems in order to control the movement, speed, etc., of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Figure 3A:
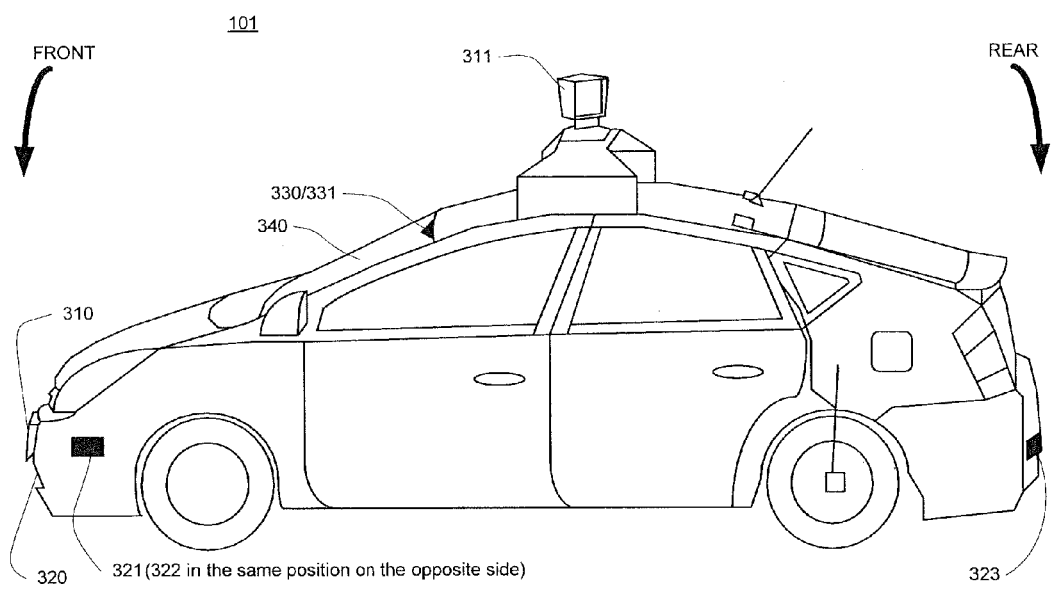
FIG. 3A is an exterior of an autonomous vehicle in accordance with aspects of the disclosure.

The vehicle may also include components 148 for detecting objects and conditions external to the vehicle such as other vehicles, obstacles in the roadway, traffic signals, signs, trees, etc. The detection system may include lasers, sonar, radar detection units (such as those used for adaptive cruise control), cameras, or any other detection devices which record data which may be processed by computer 110. For example, if the vehicle is a small passenger vehicle, the car may include a laser mounted on the roof or other convenient location. In one example, shown in FIG. 3A, vehicle 101 may comprise a small passenger vehicle. In this example, vehicle 300 may include 2 cameras 320-321 mounted under a windshield 330 near the rear view mirror (not shown) as well as radar detection units 320-323 located on the side (only one side being shown), front and rear of the vehicle. Vehicle 101 sensors may also include lasers 310 and 311, mounted on the front and top of the vehicle, respectively. The lasers may include commercially available lasers such as the Velodyne HDL-64 or other models. The lasers may provide the vehicle with range and intensity information which the computer may use to identify the location and distance of various objects in the vehicles environment. In one aspect, the laser may measure the distance between the vehicle and the object surfaces facing the vehicle by spinning on its axis and changing its pitch.

The aforementioned sensors may allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

Figure 3B:
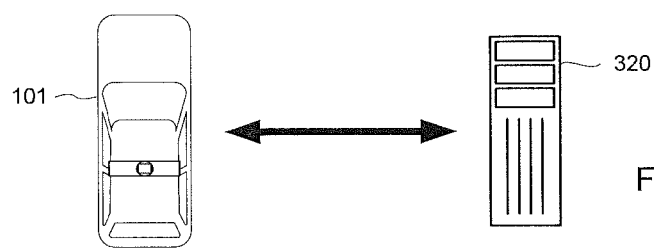
FIG. 3B is a pictorial diagram of a system in accordance with aspects of the disclosure.
Figure 3C:
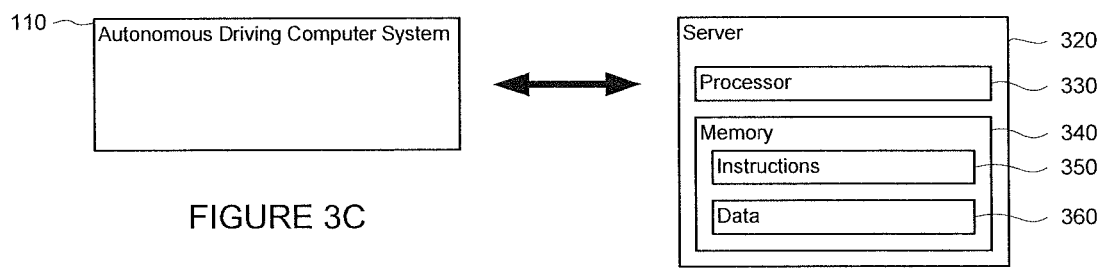
FIG. 3C is a functional diagram of a system in accordance with aspects of the disclosure.

Computer 110 may also receive or transfer information to and from other computers. For example, the map information stored by computer 110 may be received or transferred from other computers and/or the sensor data collected from the sensors of vehicle 101 may be transferred to another computer for processing as described herein. As shown in FIGS. 3B and 3C, data from computer 110 may be transmitted via a network to computer 320 for further processing. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. In another example, data may be transferred by storing it on memory which may be accessed by or connected to computers 110 and 320.

In one example, computer 320 may comprise a server having a plurality of computers, e.g., a load balanced server farm, that exchange information with different nodes of a network for the purpose of receiving, processing and transmitting the data from computer 110. The server may be configured similarly to the computer 110, with a processor 330, memory 350, instructions 360, and data 370.

In addition to processing data provided by the various sensors and other computers, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, intersections, crosswalks, speed limits, traffic signals, buildings, signs, real time traffic information, or other such objects and information.

In some examples, the detailed map information may include predetermined "rails" which computer 110 may use to maneuver vehicle 101. For example, the computer 110 may control vehicle to follow these rails or use the rails as a starting point for determining how to safely maneuver the vehicle. These rails may therefore be associated with direction information indicative of the direction of a lane (or direction traffic should move in that lane) in which the rail appears. By following the rails, vehicle 101's future locations along a route may be predicted with a high degree of accuracy.

Figure 4:
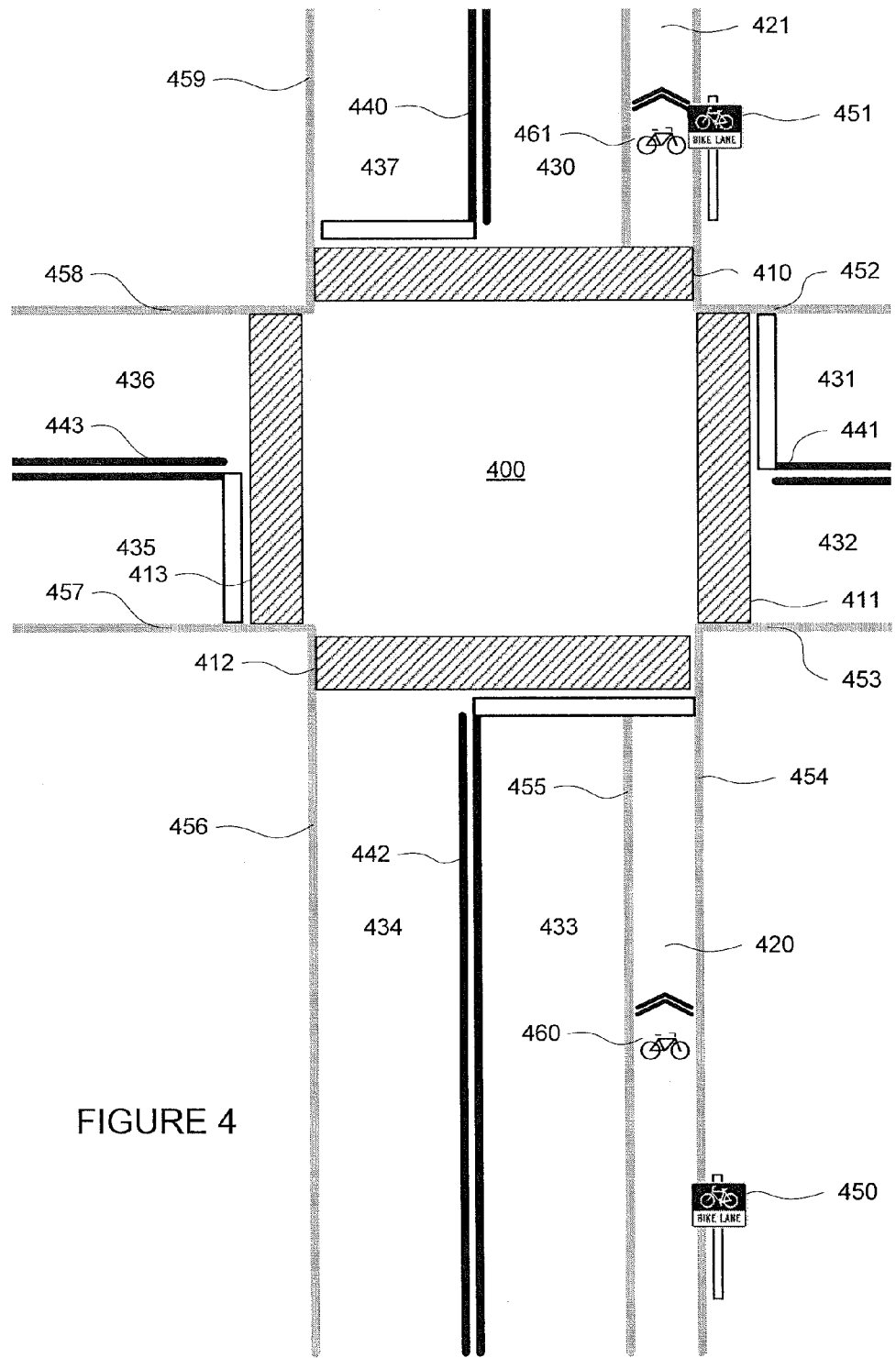
FIG. 4 is a diagram of an intersection and a portion of roadway in accordance with aspects of the disclosure.

FIG. 4 depicts a birds-eye view of an exemplary intersection 400. The intersection may include a number of different features such as crosswalks 410-13, bicycle lanes 420-21, lanes 430-37, lane lines 440-43, and roadway boundaries 450-459 (such as while lane lines, curbs, etc.). Intersection 400 may also include indicators such as signs 450-51 and 460-61 identifying specific areas such as bicycle lanes 420-21. Other features such as traffic signals or stop signs may also be present, but are not shown.

Although intersection 400 includes four roadways meeting perpendicular to one another, various other intersection configurations may also be employed. It will be further understood that aspects described herein are not limited to intersections, but may be utilized in conjunction with various other traffic or roadway designs which may or may not include additional features or all of the features described with respect to intersection 400.

Figure 5:
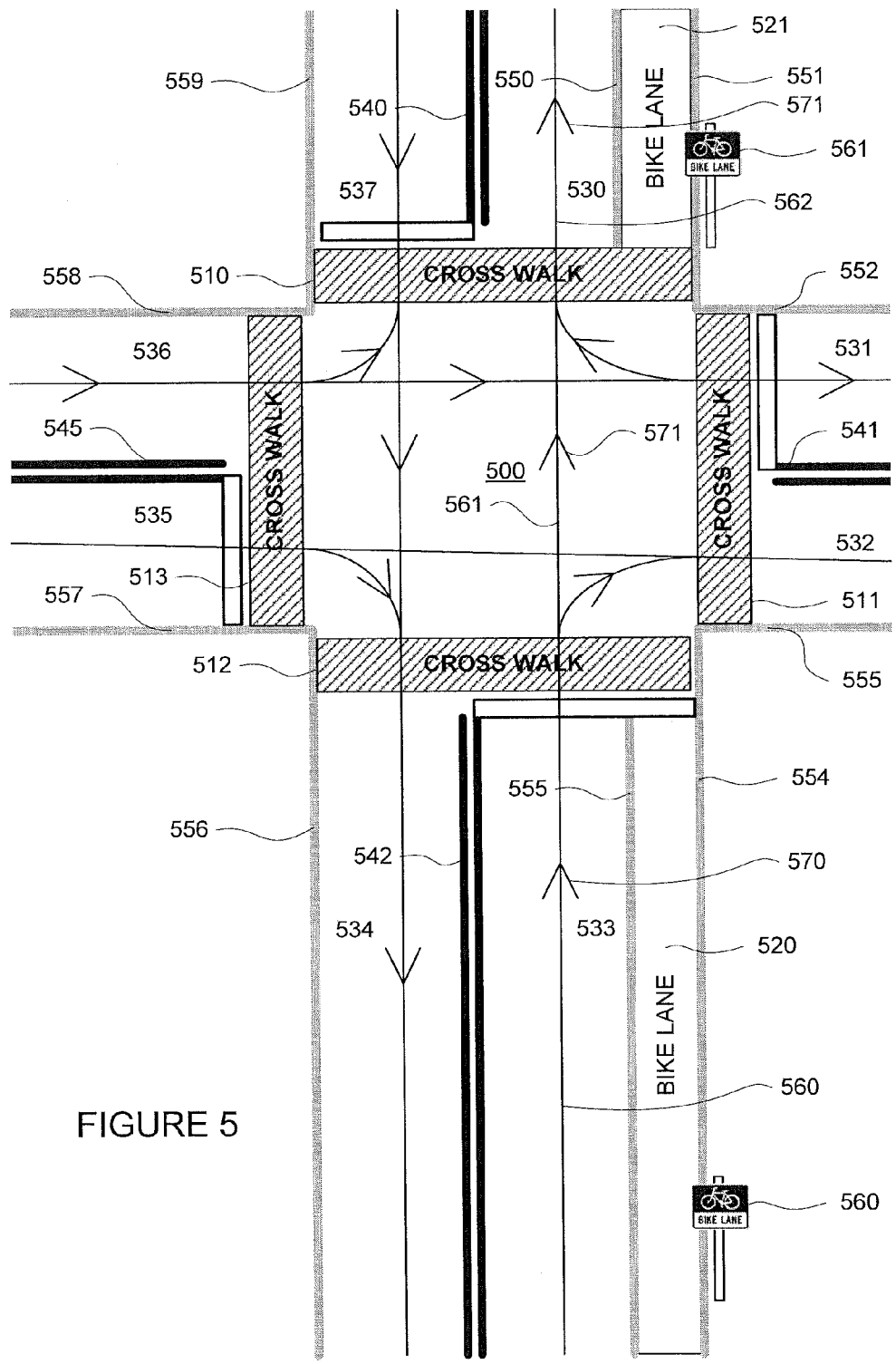
FIG. 5 is a diagram of map information in accordance with aspects of the disclosure.

Data about the intersection (or other portions of the roadway) may be collected, for example, by driving a vehicle equipped with various object detection components. The data may be processed in order to generate roadgraph information describing the roadway. For example, as shown in FIG. 5, based on laser, geographic location, and other information collected while driving a vehicle through intersection 400, a roadgraph 500 of the intersection may be generated. Similar to intersection 400, roadgraph 500 may include various features such as lanes 530-37, lane lines 540-43, and roadway boundaries 550-59 (such as white lane lines, curbs, etc.). Each of these features may be associated with geographic location information identifying where these objects may be located in the real world (for example in intersection 400). Again, although roadgraph 500 is depicted as an image-based map, it will be understood that this information may be stored as a graph network or grid of data or other information describing the various features and their relationships. The roadgraph may also include information identifying features such as crosswalk identifiers 510-13 and bicycle lane identifiers 520-21. These identifiers may, for example, define the geographic boundaries of these areas in the roadgraph. Yet further, roadgraph may include predetermined rails 560-562 and direction indications 570-72 which computer 110 may use to maneuver vehicle 101.

Again, although the detailed map information is depicted herein as an image-based map, the map information need not be entirely image based. For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Returning to FIG. 1, vehicle 101 may also include one or more signaling devices 150 for providing notifications to pedestrians external to vehicle 101. These devices may include those typical to non-autonomous vehicles such as turn signals, brake lights, reverse lights, and some audible signals (horns, reverse light beepers, etc.). A signaling device may be more advanced than typical signaling devices, for example, light up signs such as walk and don't walk lights or other image displays. The signaling devices may also provide notifications that combine visible information (such as words, symbols or lights) with audible chimes or instructions (for example "safe to cross" or "coming through" or something similar), for example, using a speaker. Other types of notification devices may include mechanisms that mimic human behaviors such as a robotic hand to make gestures or robotic eyes on the vehicle that allow the pedestrian to recognize that the vehicle "sees" the pedestrian.

Figure 6A:
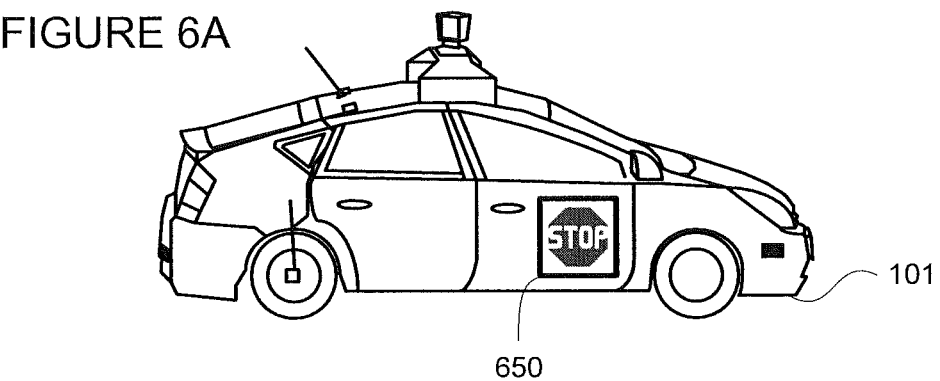
FIGS. 6A, 6B, and 6C are examples of vehicles and signaling devices in accordance with an implementation.
Figure 6B:
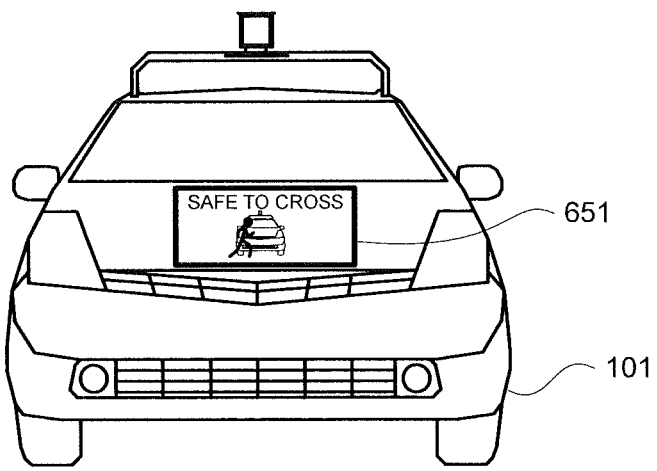
Figure 6C:
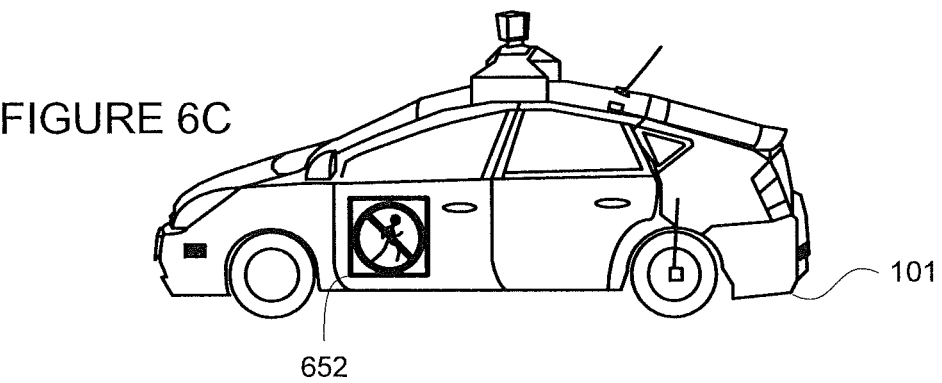

For example, FIGS. 6A, 6B, and 6C include electronic displays 650-2 which allow vehicle 101 to provide visual information to pedestrians. In these examples, the displays are located along one or more of the sides of vehicle 101 (FIGS. 6A and 6C) as well as the front of vehicle 101 (FIG. 6B). Mounted signs at other locations, such as roof, hood, or along the back of a vehicle, may also be used. In the example of FIG. 6A, electronic display 650 displays a notification as a stop sign, indicating to a pedestrian the vehicle is not going to stop and that it is not safe to cross in front of the vehicle. In the example of FIG. 6B, electronic display 651 displays a notification as a pedestrian crossing in front of a vehicle with the words "safe to cross", indicating to a pedestrian the vehicle is going to stop and that it is safe to cross in front of the vehicle. In the example of FIG. 6C, electronic display 652 displays a notification as a pedestrian crossing with a "don't" circle and cross line, indicating to a pedestrian that the vehicle is not going to stop and that it is not safe to cross in front of the vehicle.

In addition to the operations described above and illustrated in the figures, various operations will now be described. It should be understood that the following operations do not have to be performed in the precise order described below. Rather, various steps can be handled in a different order or simultaneously, and steps may also be added or omitted.

A vehicle including one or more sensors may be driven along a roadway. For example, vehicle 101 may be operating in an autonomous mode where features such as the braking system 180, acceleration system 182, signaling system 184, and navigation system 186 are being controlled by computer without continuous input from a driver. In this regard, a driver may initially input a destination using user input 140, and computer 110 may respond by determining a route between the vehicle's current location and the destination based on the detailed map 136. For example, vehicle 101 may follow a route of a plurality of the rails from the detailed map 136.

Figure 7:
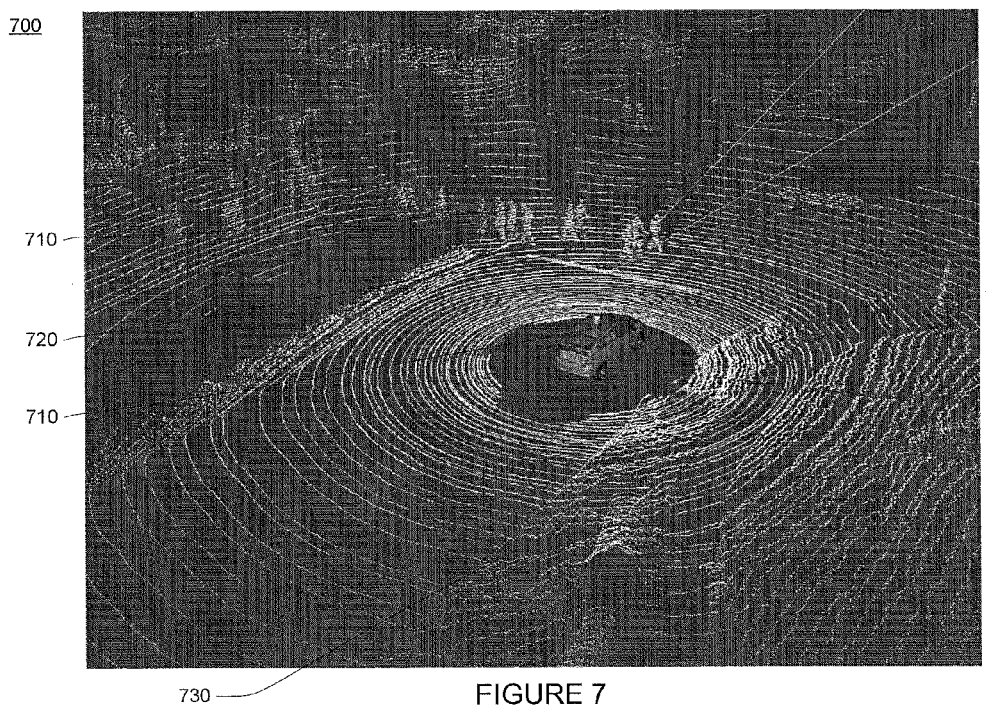
FIG. 7 is a diagram of laser data in accordance with an implementation.

The vehicle's sensors may collect data about the vehicle's environment and send the sensor data to computer 110 for processing. For example, the sensors may include a laser such as laser 311 of FIG. 3. FIG. 7 depicts an exemplary image 700 of vehicle 101 approaching an intersection. The image was generated from laser scan data collected by the vehicle's lasers for a single 360 degree scan of the vehicle's environment. The white lines represent how the laser "sees" its environment. When a plurality of the data points generated by the laser are considered together, the data points may indicate the shape and three-dimensional (3D) location (x,y,z) of other items in the vehicle's environment. For example, the laser scan data may indicate the outline, shape and distance from vehicle 101 of various objects such as pedestrians 610, vehicles 620, and curb 630.

Using the sensor data, the computer 110 may identify objects in the vehicle's environment. For example, objects may be detected by identifying clusters of data points from the laser scan data indicative of the outline or edges of objects such as those noted above in FIG. 6. These clusters may be processed to estimate the characteristics of the particular object such as location (relative to vehicle 101, the detailed map 136, GPS latitude and longitude coordinates, or another reference) and size. As the laser data points are collected over some period of time as the laser sweeps through its field of view, computer 110 may identify both fixed objects (such as lane marks) as well as moving objects (such as other vehicles, pedestrians, etc.).

Figure 8:
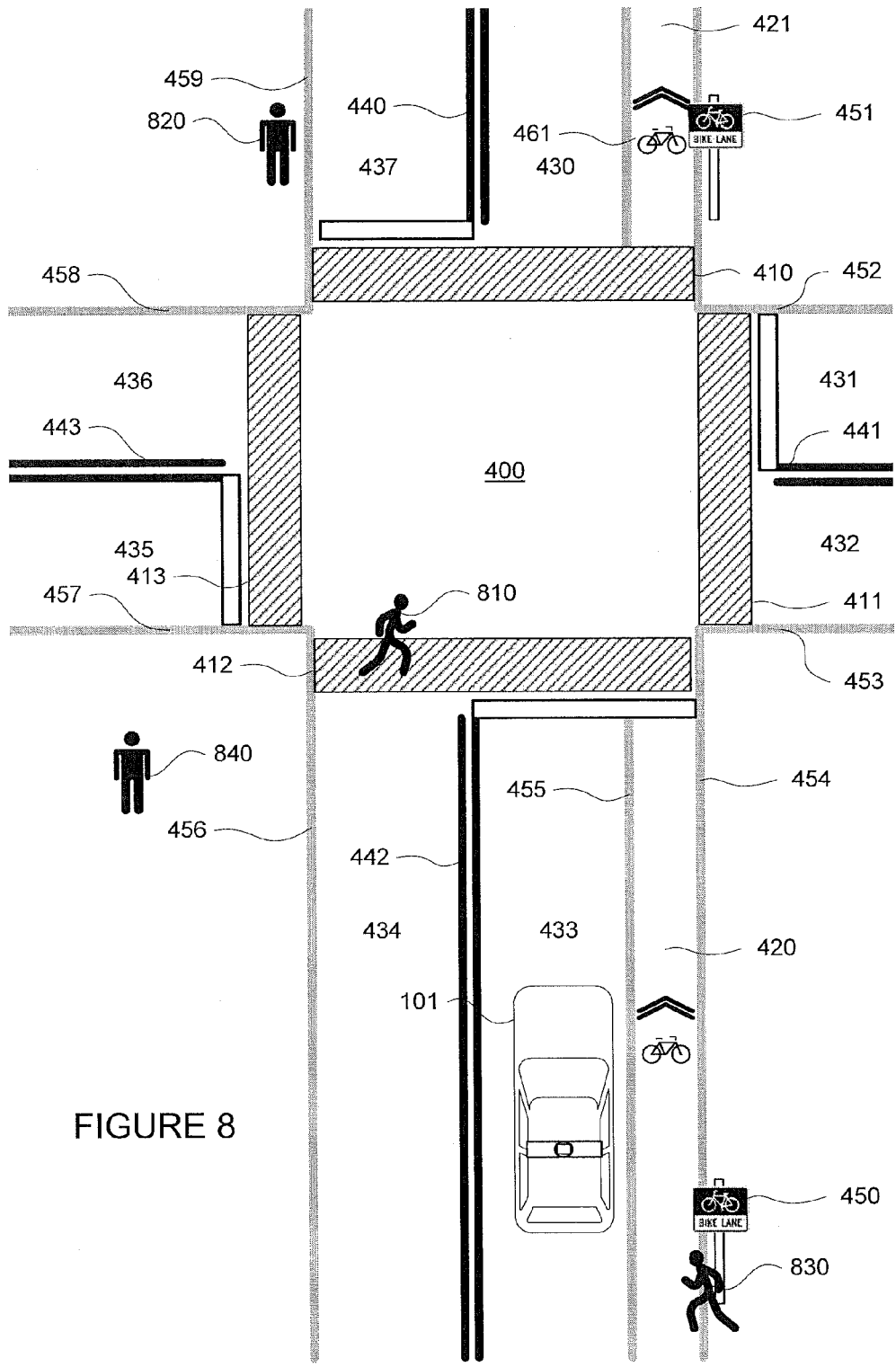
FIG. 8 is another diagram of an intersection and a portion of roadway in accordance with aspects of the disclosure.
Figure 9:
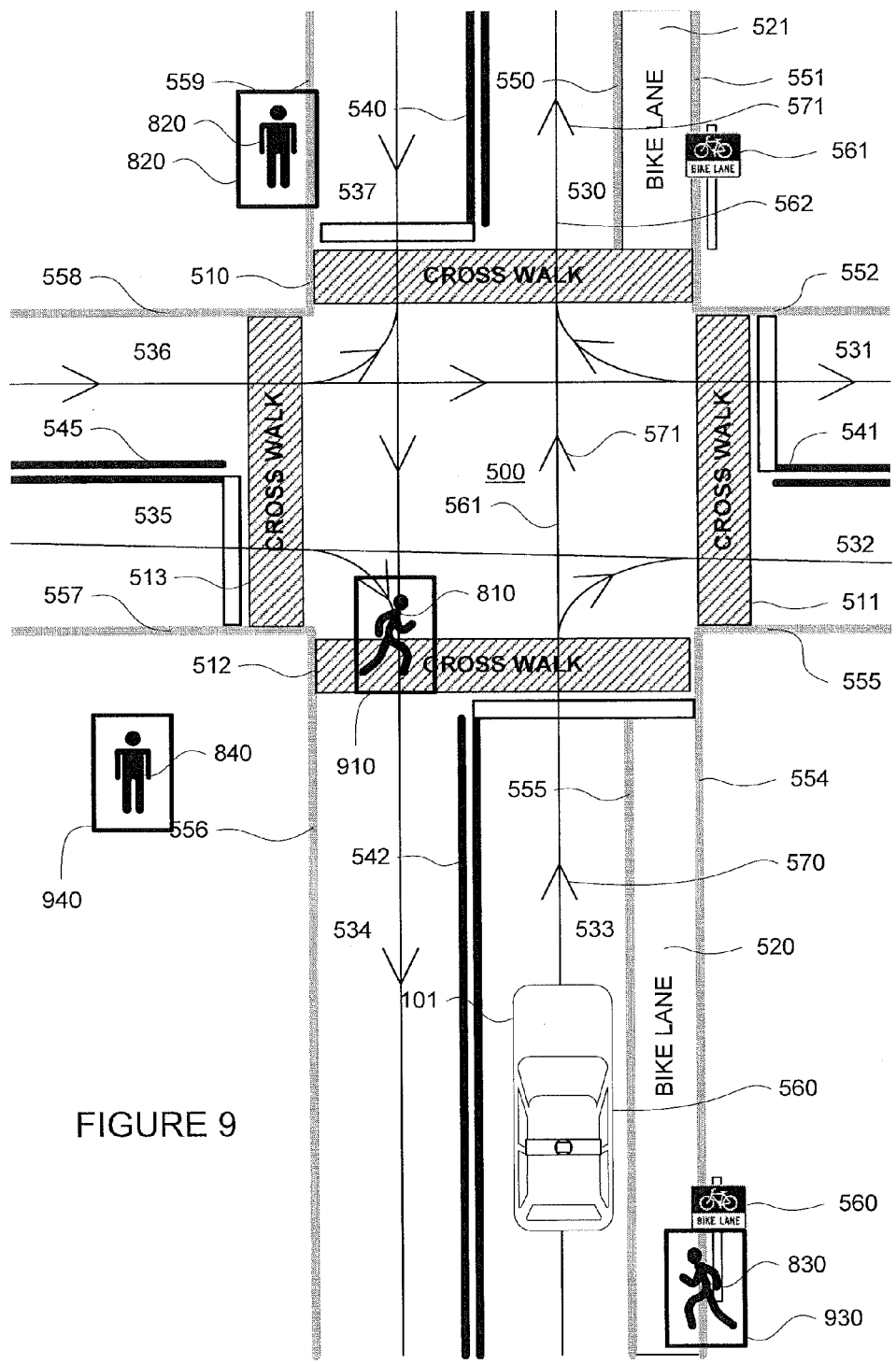
FIG. 9 is a diagram of sensor data and map information in accordance with aspects of the disclosure.

In the example of FIG. 8, vehicle 101 is approaching intersection 400. Various objects in vehicle 101's environment may be detected by the vehicle's object detection components 148. For example, in addition to the roadway features (discussed above with regard to FIG. 4), vehicle 101's sensors may detect and generate sensor data regarding pedestrians 810, 820, 830, and 840. FIG. 9 is an example of sensor data received by computer 110 from the detection components 148 overlaid on the roadgraph 500. In this example, computer 110 has identified objects 910, 920, 930, and 940 corresponding to pedestrians 801, 820, 830, and 840, respectively.

In some examples, the computer 110 may classify a detected object. For example, an object may be classified as a pedestrian based on its characteristics, image matching, estimations based on characteristics determined from sensor readings, the location of the pedestrian, etc. In one example, objects which are located completely or partly within a predefined area of the roadgraph may be identified based on the area identifier. For example, as shown in of FIGS. 9 and 910 the geographic locations of objects 910, 920, 930, and 940 may be compared to the corresponding geographic locations in roadgraph 500. In this example, object 910 appears within crosswalk 512. Accordingly, objects 910 may be classified by the computer as a pedestrian based on its location relative to the crosswalk identifier.

In another example, an object may be classified based on an object type models or machine learning classifiers that output a possible object type and corresponding possibilities based on the determined characteristics for that object. In an example model, an object's type may be identified based on its location with respect to a roadway, its speed, its size, its comparison to sensor data collected by other pre-identified object (such as by image matching), etc. For example, given an object, such as object 920, that is perceived to be about 14 inches wide, 5 feet tall, and 8 inches wide, an object type model may output information indicating that the object is 99% likely to be a pedestrian, 0.5% likely to be a bicyclist and 0.5% likely to be a vehicle. Once an object is perceived, the object type model may be used to identify the type of the perceived object.

Once an object is identified, and in some examples, classified as a pedestrian, the computer 110 may estimate the object's intentions. Specifically, the computer 110 may determine whether the object is attempting to cross the roadway in which vehicle 101 is currently driving. This may include determining the speed and heading of the object, whether they are already in the roadway, the speed of vehicle 101, and the distance between vehicle 101 and the object. For example, if a pedestrian, such as pedestrian objects 910 or 920 of FIG. 9, is standing or walking at or near a crosswalk, computer 110 may determine that the pedestrian is attempting to cross the roadway. In another example, if a pedestrian, such as object 930, is moving from outside of the roadway (outside the white lane lines or curb) into the roadway, but is not at or near a crosswalk, computer may determine that the pedestrian is attempting to cross the roadway (such as where the pedestrian is attempting to jaywalk across the roadway). In yet another example, computer 110 may determine that an object, such as object 840, does not intend to cross the roadway given such characteristics as its relative distance from a roadway boundary, whether the object is in the roadway or a crosswalk, the object's current heading and speed, etc.

If the computer 110 determines that the pedestrian is likely to be crossing the roadway, computer 110 may also estimate a projected path for the pedestrian to cross the roadway. In one example, if the pedestrian has not yet begun to cross the roadway, such as pedestrian object 910 of FIG. 10, the computer 110 may assume that the pedestrian is likely to cross the roadway in a path 1010 (shown by the dashed lines) that would be at or near perpendicular to the direction of the lanes of the roadway. In another example, if the pedestrian, such as pedestrian object 920 or object 930, has already begun to cross the roadway, computer 110 may continue the current heading of the pedestrian determined from the sensor data to estimate a projected path, such as paths 1020 or 1030, across the roadway. Alternatively or in addition to using the current heading, computer 110 may use a previous location estimate of the pedestrian to estimate a projected path across the roadway. Computer 110 need not generate a predicted path across the roadway for object 940 as computer 110 may have already determined that object 940 is not likely to cross the roadway.

Figure 10:
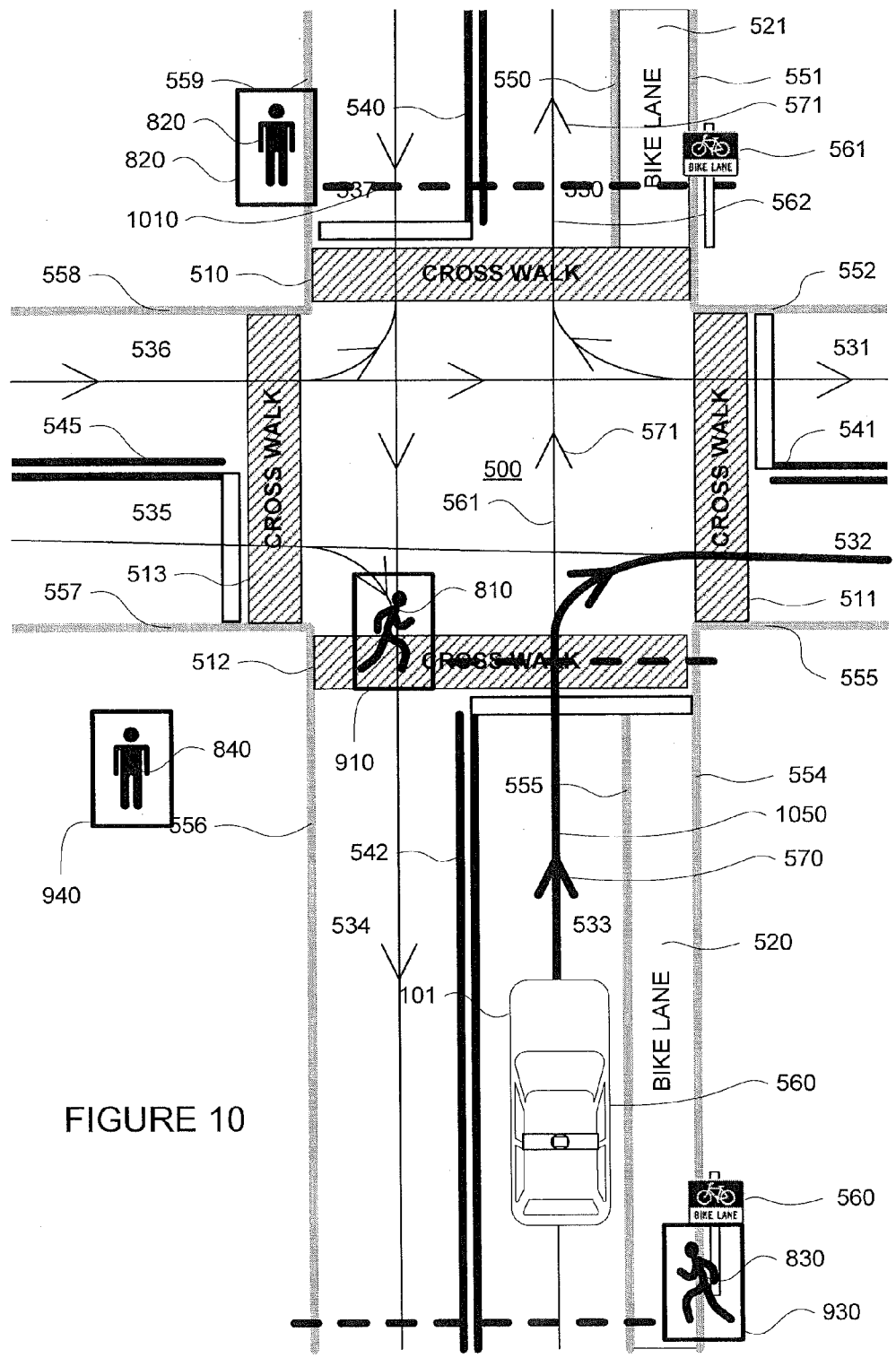
FIG. 10 is a diagram of projected paths, sensor data, and map information in accordance with aspects of the disclosure.

If the object is attempting to cross the roadway, computer 110 may determine whether the projected path of the object will cross with the projected path of vehicle 101. As noted above, the projected path of vehicle 101 may be determined from the route and rails that computer 110 is and will be following at that particular point in time. As shown in FIG. 10, computer 110 is following path 1050. For example, the projected path of pedestrian object 910, projected path 1010 will cross with projected path 1050 of vehicle 101. In another example, projected paths 1050 and 1020 will not cross at all. In yet another example, object 930 is about to cross the roadway, but is already behind vehicle 101, and thus, the projected paths 1030 and 1050 will not cross.

If the projected paths will not cross, computer 110 may continue to maneuver vehicle 101 along the route. If projected paths will cross, computer 110 may select a plan of action. For example, computer 110 may determine whether vehicle 101 should yield to the pedestrian or object (for example by stopping or slowing down) or continue along the route without stopping or slowing down. This determination may include considering factors such as the speed of the vehicle, distance along the route between the vehicle and the predicted path of the pedestrian, and the braking system 180. This decision making may also be based on legal requirements (vehicles must always stop at crosswalks, etc.).

In yet another example, given the current speed of vehicle 101 and the distance between the vehicle and the pedestrian, computer 110 may determine whether simply slowing down and yielding (rather than coming to a complete stop) may allow the pedestrian a minimum amount of time (given the distance the pedestrian must still travel along the predicted path) to safely exit the roadway without vehicle 101 coming within some threshold distance of the pedestrian as the pedestrian follow the projected path. For example, computer 110 may determine that if vehicle 101 slows down, or continues on its current path, the pedestrian would have at least 30 seconds (the minimum amount of time given the distance the pedestrian has to travel along the predicted path across the roadway) to cross the roadway without vehicle 101 coming within 20 feet (the threshold distance) of the pedestrian. The minimum amount of time may be based upon the slowest expected speed of a pedestrian crossing the roadway with some additional time to ensure that allowing the pedestrian to cross without fully stopping the vehicle is actually a safe plan. The above numbers are merely examples, and various other threshold distances and/or times may also be used. If the vehicle 101 is able to safely yield by slowing down, computer 110 may select this plan of action.

In another example, computer 110 may determine whether vehicle 101 may safely come to a complete stop within some threshold distance of the pedestrian and/or the projected path of the pedestrian. In this regard, the computer 101 may consider the capabilities of the braking system as well as predetermined braking limits because braking too hard cause vehicle 101 to jerk to a stop, skid, or the tires to screech. This, in turn may frighten or otherwise disturb the driver of the vehicle and/or the pedestrian. If the vehicle 101 is unable to safely yield, but is able to safely come to a complete stop, computer 110 may select this plan of action. If the vehicle 101 is unable to safely yield or come to a complete stop (and in some cases, is not otherwise required to do so by law), computer 110 may select a plan of action that includes continuing along the route and not stopping or slowing down.

The vehicle may then both act on the plan of action and provide a notification to the pedestrian indicating the selected plan of action (yield, stop, or continue). For example, computer 110 may control the braking system 180, acceleration system 182, steering system 184, etc. in order to maneuver vehicle 101 according to the selected plan of action. As noted above, computer 110 may also use any combination of the signaling devices 150 (such as signal devices 650-52 of FIGS. 6A-6C) to provide a notification to the object or pedestrian object. For example, if the plan of action involves yielding or stopping and waiting for the pedestrian to cross, computer 110 may use the signals depicted in FIG. 6B. In another example, if the plan of action involves continuing along the route, computer 110 may use the signals depicted in FIGS. 6A and/or 6B. As noted above these signals may also be combined with audible warnings beeping or announcements.

Figure 11:
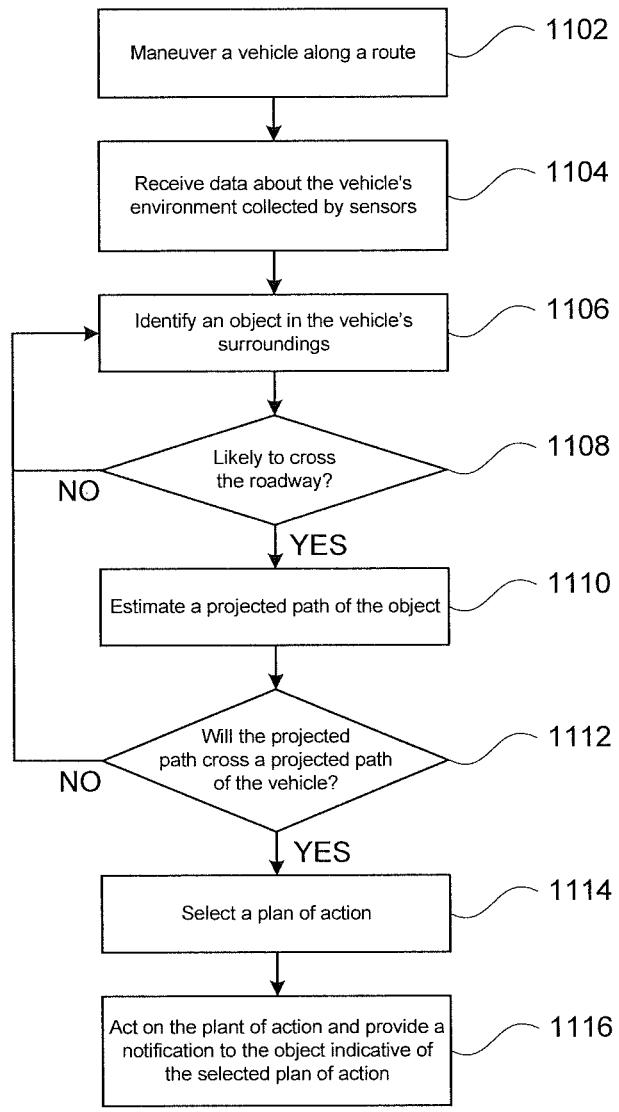
FIG. 11 is a flow diagram in accordance with aspects of the disclosure.

Flow diagram 1100 of FIG. 11 is an example of some of the aspects described above as performed by computer 110. In this example, computer 110 maneuvers a vehicle along a route, such as an autonomous driving mode without continuous input from a driver at block 1102. The computer receives data about the vehicle's environment collected by the vehicle's sensors at block 1104. Using the data, computer 110 may identify an object in the vehicle's environment. The computer then determines whether this object is likely to cross a roadway along which the vehicle is currently traveling on the route. If not, the computer identifies other objects in the vehicle's environment from received sensor data at block 1106 and determines whether those other objects are likely to cross the roadway. In some examples, the computer may first determine whether the object is a pedestrian, for example using one or more of the methods described above, before moving from block 1106 to block 1108.

If the computer identifies an object that is likely to cross the roadway at block 1108, computer 110 estimates a projected path of the object at block 1110. Computer 110 then determines whether the projected path of the object with cross a projected path of the vehicle, for example, based on the route, at block 1112. In not, the computer identifies other objects in the vehicle's environment from received sensor data at block 1106 and determines whether those other objects are likely to cross the roadway.

If the computer determines that a projected path of an object will cross with the projected path the computer at block 1112, computer 110 selects a plan of action at block 1114. The plan of action may include one of stopping the vehicle and yielding to the object, slowing the vehicle down and yielding to the object, or continuing along the route without change. Once a plan of action is selected, the computer acts on the plan of action and provides a notification to the object indicative of the selected plan of action at block 1116.

The notifications may replace those signals initiated by a driver such as making eye contact with, waving to, speaking to, or flashing lights to a pedestrian while also sufficiently reassuring the pedestrian that it is indeed safe or not safe to cross the roadway. In addition, the notifications provided by the computer 110 do not originate from, nor do they require specific input from the driver of the vehicle. For example, computer 101 may both select a plan of action and provide a notification of the intent of the vehicle to a pedestrian without requiring the driver to select the plan initiate the notification. For example, while a driver of a vehicle (autonomous or not) may indicate his or her intent by using verbal or hand signals or activating a signaling device of the vehicle (such as flashing high beams or activating a stop sign on a school bus), these features must be activated or otherwise initiated by the driver. In other words, they are not automatically achieved independent from the driver as in the examples described herein.

As these and other variations and combinations of the features discussed above can be utilized without departing from the subject matter as defined by the claims, the foregoing description of exemplary implementations should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
    maneuvering, by one or more processors, a vehicle along a route including a roadway in an autonomous driving mode without continuous input from a driver;
    receiving, by the one or more processors, sensor data about an external environment of the vehicle collected by sensors associated with the vehicle;
    identifying, by the one or more processors, an object in the external environment of the vehicle from the sensor data;
    determining, by one or more processors, that the object is likely to cross the roadway based on a current heading and speed of the object as determined from the sensor data; and
    based on the determination, selecting, by the one or more processors, a plan of action for responding to the object including yielding to the object; and
    providing, by the one or more processor, without specific initiating input from the driver, a notification to the object indicating that the vehicle will yield to the object and allow the object to cross the roadway.

2. The method of claim 1, further comprising:
    determining that a projected path of the object will cross with a projected path of the vehicle, wherein the projected path of the vehicle is based on the route; and
    wherein the plan of action is selected further based on the determination that a projected path of an object will cross with a projected path of the vehicle.

3. The method of claim 2, wherein the plan of action is selected only when the object is a pedestrian.

4. The method of claim 1, wherein determining that the object is likely to cross the roadway is further based on a proximity of the object to the roadway.

5. The method of claim 1, wherein determining that the object is likely to cross the roadway is further based on a location of the object relative to a crosswalk.

6. The method of claim 1, wherein selecting the plan of action includes determining whether if the vehicle slows down or continues on a current path of the vehicle, the object would have at least a minimum amount of time, given a distance a pedestrian has to travel along the predicted path across the roadway, to cross the roadway without the vehicle coming within a threshold distance of the object.

7. The method of claim 1, wherein selecting the plan of action includes determining, by the one or more processors, whether the vehicle is able to come to a complete stop within a threshold distance of the projected path of the object.

8. The method of claim 7, wherein determining whether the vehicle is able to come to a complete stop within a threshold distance is based on the capabilities of a braking system of the vehicle, predetermined braking limits, and the distance between the vehicle and the projected path of the object along the projected path of the vehicle.

9. The method of claim 1, wherein the notification includes playing an audible instruction message indicative of the selected plan through a speaker of the vehicle.

10. The method of claim 1, wherein the notification is provided by displaying an image indicative of the selected plan of action on an electronic sign mounted on the vehicle.

11. The method of claim 1, wherein the notification is provided by displaying text indicative of the selected plan of action on an electronic sign mounted on the vehicle.

12. A system comprising one or more processors configured to:
    maneuver a vehicle along a route including a roadway in an autonomous driving mode without continuous input from a driver;
    receive sensor data about an external environment of the vehicle collected by sensors associated with the vehicle;
    identify an object in the external environment of the vehicle from the sensor data;
    determine that the object is likely to cross the roadway based on a current heading and speed of the object as determined from the sensor data;
    determine that a projected path of the object will cross with a projected path of the vehicle, wherein the projected path of the vehicle is based on the route; and
    based on the determinations, select a plan of action for responding to the object including yielding to the object; and
    provide without specific initiating input from the driver, a notification to the object indicating that the vehicle will yield to the object and allow the object to cross the roadway.

13. The system of claim 12, wherein the notification is provided by displaying an image indicative of the selected plan of action on an electronic sign mounted on the vehicle.

14. The system of claim 12, wherein the one or more processors are further configured to determine that the object is likely to cross the roadway further based on a proximity of the object to the roadway.

15. The system of claim 12, wherein the one or more processors are further configured to determine that the object is likely to cross the roadway further based on a location of the object relative to a crosswalk.

16. The system of claim 12, wherein the one or more processors are further configured to select the plan of action that includes determining whether if the vehicle slows down or continues on a current path of the vehicle, the object would have at least a minimum amount of time, given a distance the pedestrian has to travel along the predicted path across the roadway, to cross the roadway without the vehicle coming within a threshold distance of the object.

17. The system of claim 12, wherein the one or more processors are further configured to select the plan of action includes determining whether the vehicle is able to come to a complete stop within a threshold distance of the projected path of the object.

18. The system of claim 17, wherein the one or more processors are further configured to determine that the vehicle is able to come to a complete stop within a threshold distance based on the capabilities of a braking system of the vehicle, predetermined braking limits, and the distance between the vehicle and the projected path of the object along the projected path of the vehicle.

* * * * *